United States Patent
Moors (10) Patent No.: US 9,527,273 B2
(45) Date of Patent: Dec. 27, 2016

(54) INFUSION BOLT, METHOD OF USE AND METHOD OF MANUFACTURE

(71) Applicant: General Electric Company, Schenectady, NY (US)

(72) Inventor: Thomas Michael Moors, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 14/260,720

(22) Filed: Apr. 24, 2014

(65) Prior Publication Data
US 2015/0306858 A1    Oct. 29, 2015

(51) Int. Cl.
| F16B 1/00 | (2006.01) |
| B33Y 80/00 | (2015.01) |
| F16B 39/22 | (2006.01) |
| B29C 67/00 | (2006.01) |
| B22F 3/105 | (2006.01) |
| B29L 31/00 | (2006.01) |
| B22F 5/10 | (2006.01) |

(52) U.S. Cl.
CPC ............. B33Y 80/00 (2014.12); F16B 39/225 (2013.01); *B22F 3/1055* (2013.01); *B22F 5/10* (2013.01); *B29C 67/0051* (2013.01); *B29L 2031/727* (2013.01)

(58) Field of Classification Search
CPC ....... B33Y 80/00; F16B 39/225; B22F 3/1055
USPC ........................... 411/82.1; 156/98, 382, 305
See application file for complete search history.

(56) References Cited

U.S. PATENT DOCUMENTS

| 4,044,798 A * | 8/1977 | Feldstein ............. F16L 55/1116 138/89 |
| 4,258,596 A * | 3/1981 | Bisbing ............... F16B 23/0046 411/403 |
| 4,370,372 A * | 1/1983 | Higgins .................... F16B 5/01 156/256 |
| 4,556,439 A | 12/1985 | Bannink, Jr. |
| 4,893,974 A * | 1/1990 | Fischer .................. F16B 13/146 405/259.3 |
| 4,973,208 A * | 11/1990 | Gauron ................... B29C 70/68 411/258 |
| 5,129,904 A * | 7/1992 | Illi ........................ A61B 17/683 606/151 |
| 5,143,498 A * | 9/1992 | Whitman ................ F16B 33/02 411/311 |
| 5,641,258 A * | 6/1997 | Sala ...................... F16B 23/003 411/402 |
| 6,773,215 B2 | 8/2004 | Cuva et al. |
| 6,837,659 B2 * | 1/2005 | Oberkofler ................ F16B 5/01 411/479 |

(Continued)

*Primary Examiner* — Gary Estremsky
(74) *Attorney, Agent, or Firm* — Ernest G. Cusick; Hoffman Warnick LLC (57) ABSTRACT

Various embodiments include an infusion bolt and methods of manufacturing such a bolt. In one embodiment an infusion bolt includes: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head.

9 Claims, 7 Drawing Sheets

(56) References Cited

U.S. PATENT DOCUMENTS

| | | | |
|---|---|---|---|
| 7,225,710 B2* | 6/2007 | Pacheco, Jr. | B25B 13/065 |
| | | | 411/403 |
| 7,335,012 B2 | 2/2008 | Blanton et al. | |
| 7,338,493 B1* | 3/2008 | Vandewalle | A61B 17/686 |
| | | | 606/86 A |
| 7,815,988 B2* | 10/2010 | Stumpf | B29C 65/1435 |
| | | | 248/225.21 |
| 8,439,220 B2* | 5/2013 | Norman | F01D 11/00 |
| | | | 220/228 |
| 8,506,258 B2 | 8/2013 | Baker et al. | |
| 8,506,746 B2 | 8/2013 | Korya et al. | |
| 8,556,558 B1* | 10/2013 | Hunt | F16B 39/021 |
| | | | 411/395 |
| 2004/0109738 A1* | 6/2004 | Ducker, III | F16B 33/004 |
| | | | 411/82.1 |
| 2005/0244244 A1* | 11/2005 | Ayrle | C04B 28/24 |
| | | | 411/82 |
| 2010/0115882 A1* | 5/2010 | Seroiszka | F16B 13/141 |
| | | | 52/787.1 |

* cited by examiner

INFUSION BOLT, METHOD OF USE AND METHOD OF MANUFACTURE

FIELD OF THE INVENTION

The subject matter disclosed herein relates to components for joining materials. Specifically, the subject matter disclosed herein relates to a bolt for use in joining materials.

BACKGROUND OF THE INVENTION

Composite materials can be useful in a variety of industrial applications (e.g., in turbomachiney), for example, where temperature, pressure, strain/stress conditions, etc., make the use of constituent materials less desirable. Composite materials are often formed and then coated with a laminate to protect the underlying materials. However, manipulating composite structures can be difficult, especially when manipulation punctures the laminate. For example, when attempting to join two laminated composite structures or a laminated composite structure with a delaminated composite (or other structure), such as through drilling, pinning, etc., the laminate on the composite structure can be damaged. In some cases, drilling through a laminated composite causes cracking and/or fracturing in the laminate, which violates the structural integrity of that composite.

BRIEF DESCRIPTION OF THE INVENTION

Various embodiments include an infusion bolt, methods of using such a bolt, and methods of manufacturing such a bolt. In one embodiment an infusion bolt includes: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head.

A first aspect includes an infusion bolt having: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head.

A second aspect includes a method including: positioning an infusion bolt in an aperture within a laminate structure and in an aperture in a distinct structure, the infusion bolt including: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head; and flowing a bonding material through the infusion bolt, between the axially accessible opening and the axially extending apertures to join the laminate structure and the distinct structure.

A third aspect includes a method including: three-dimensionally printing an infusion bolt, the infusion bolt having: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the subject matter disclosed herein relates to a bolt for use in joining materials. As further noted herein, manipulating composite structures can be difficult, especially when manipulation punctures the laminate. For example, when attempting to join two laminated composite structures or a laminated composite structure with a delaminated composite (or other structure), such as through drilling, pinning, etc., the laminate on the composite structure can be damaged. In some cases, drilling through a laminated composite causes cracking and/or fracturing in the laminate, which violates the structural integrity of that composite.

Various embodiments include an infusion bolt, methods of using such a bolt, and methods of manufacturing such a bolt. In some embodiments an infusion bolt includes: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head.

Various additional embodiments include a method, including: positioning an infusion bolt in an aperture within a laminate structure and in an aperture in a distinct structure, the infusion bolt including: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head; and flowing a bonding material through the infusion bolt, between the axially accessible opening and the axially extending apertures to join the laminate structure and the distinct structure.

Various further embodiments include a method, including: three-dimensionally printing an infusion bolt, the infusion bolt having: a head having an axially accessible opening extending therethrough; and a shaft extending from the head, the shaft having: an inner cavity fluidly connected with the axially accessible opening of the head; a radially outer surface surrounding the inner cavity; and a set of axially extending apertures along the radially outer surface, the set of axially extending apertures fluidly connected with the inner cavity and the axially accessible opening in the head.

As used herein, the terms "axial" and/or "axially" refer to the relative position/direction of objects along axis A (FIG. 1, FIG. 2), which is substantially parallel with the axis of insertion/removal of the bolt. As further used herein, the terms "radial" and/or "radially" refer to the relative position/direction of objects along axis (r) (FIG. 1, FIG. 2), which is substantially perpendicular with axis A and intersects axis A at only one location. Inner and outer, as used herein, can refer to a radial position along axis (r). Additionally, the terms "circumferential" and/or "circumferentially" refer to the relative position/direction of objects along a circumference which surrounds axis A but does not intersect the axis A at any location.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

Figure 1:
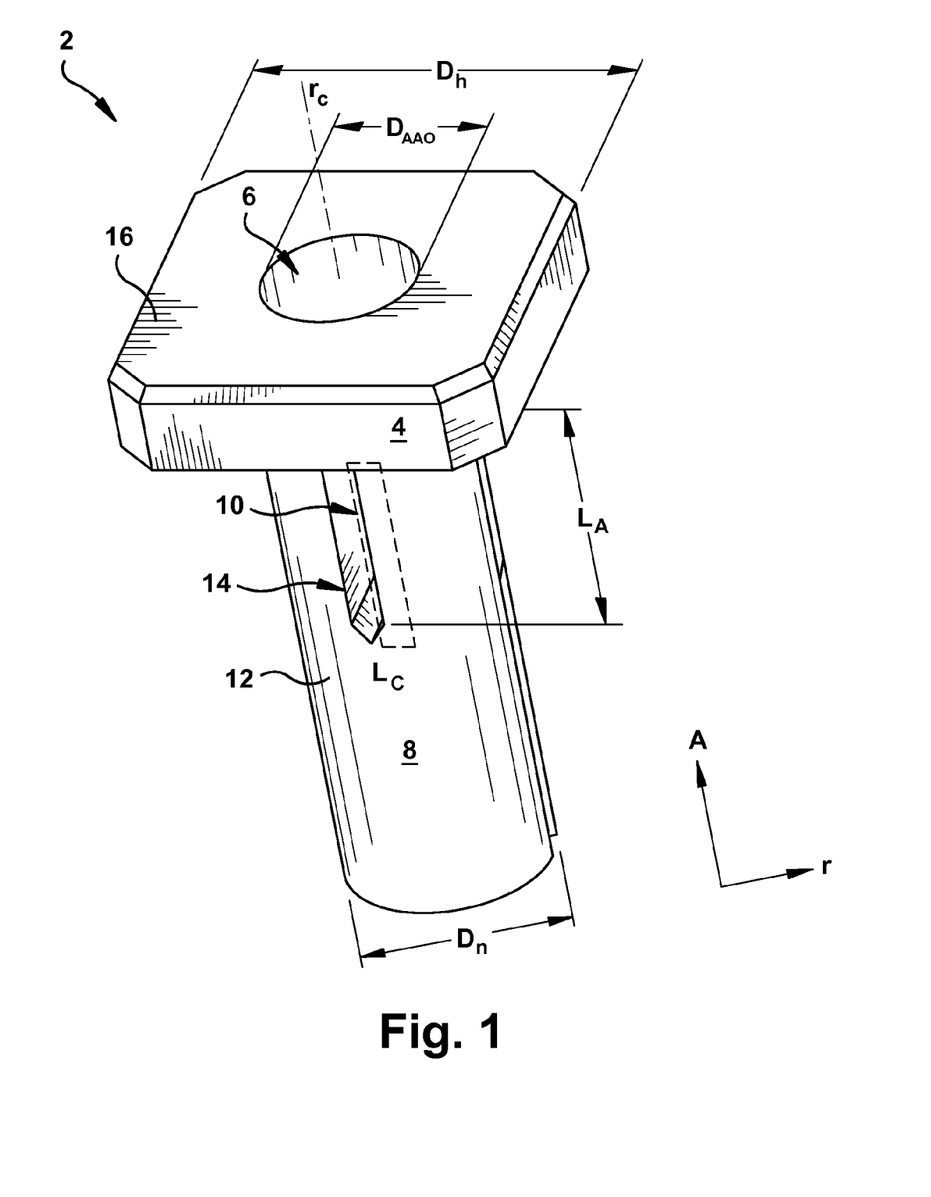
FIG. 1 shows a three-dimensional perspective view of an infusion bolt according to various embodiments.

FIG. 1 shows a schematic three-dimensional perspective view of an infusion bolt 2 according to various embodiments. It is understood that as used herein, the term "infusion bolt" may refer to various bolt structures that may be used to infuse (inject) a bonding material to join adjacent components, or bolt structures that may be used to pull (via vacuum) a bonding material to join adjacent components.

Returning to FIG. 1, an infusion bolt 2 according to various embodiments can include a head 4 having an axially accessible opening 6 extending therethrough. That is, according to various embodiments, the axially accessible opening 6 can extend completely axially through the head 4 (and fluidly connect with an inner cavity in the shaft, as described herein). The infusion bolt 2 can also include a shaft 8 extending from the head 4. The shaft 8 can include an inner cavity 10 (shown partially in phantom), fluidly connected (allowing fluid flow therethrough) with the axially accessible opening 6 of the head 4.

Also shown, the shaft 8 can include a radially outer surface 12 surrounding the inner cavity 10. Along the radially outer surface 12 are a set of axially extending apertures 14 fluidly connected with the inner cavity 10 (and via the inner cavity 10), and the axially accessible opening 6 in the head 4. That is, the axially accessible opening 6, the inner cavity 10 and the set of axially extending apertures 14 allow for the flow of fluid from a distal end 16 of the head 4 to the radially outer surface 12 of the shaft 8, and vice versa.

In various embodiments, the axially accessible opening 6 is substantially circular, and in some cases, the axially accessible opening 6 is substantially concentric about the radial center ($r_c$) of the head 4. In some cases, the set of axially extending apertures 14 includes at least two distinct apertures 14. Various embodiments include axially extending apertures 14 that have a greater axial length ($L_A$) than circumferential length ($L_C$), measured along the radially outer surface 12. In some cases, the at least two distinct axially extending apertures 14 can oppose one another along the radially outer surface 12, that is, they are off-set from one another by approximately 180 degrees along the radially outer surface 12. In other words, each axially extending aperture 14 is equally spaced from each adjacent axially extending aperture 14 along the radially outer surface 12. According to various embodiments, the head 4 has a greater diameter ($D_h$) than a diameter ($D_n$) of the shaft 8, and the axially accessible opening 6 has a lesser diameter ($D_{AAO}$) than the diameter ($D_n$) of the shaft 8. In some cases, the head 4 and the shaft 8 are substantially unitary, that is, formed from one material continuously. In some cases, the head 4 and the shaft 8 include a metal (e.g., a laser-sintered powder metal) or a plastic. As described herein, the infusion bolt 2 can be formed according to various methods, for example, three-dimensional (3D) printing.

Figure 2:
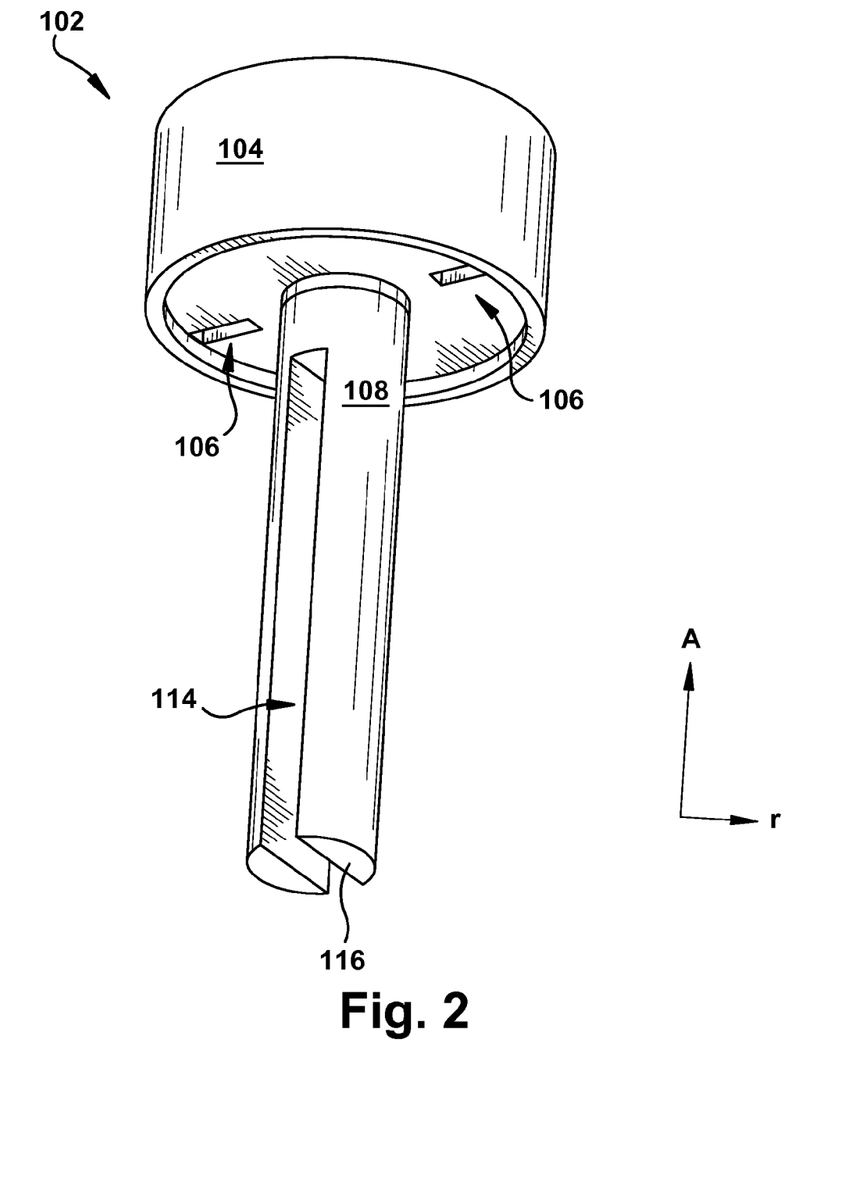
FIG. 2 shows a three-dimensional perspective view of an infusion bolt according to various alternative embodiments.

FIG. 2 (with continuing reference to FIG. 1) shows another an infusion bolt 102 according to various embodiments. It is understood that common reference numerals between FIG. 1 and FIG. 2 can indicate substantially similar (and in some cases, identical) components, and as such, additional description of these components is omitted. As shown, the infusion bolt 102 can include a head 104 includes a set of axially extending passages 106 extending axially entirely through the head 104. In various embodiments, the set of axially extending passages 106 are located radially outward of the axially accessible opening 6. According to other embodiments, the shaft 8 can include a set of axially extending apertures 114 that each extend to a distal end 116 of the shaft 108.

Figure 3:
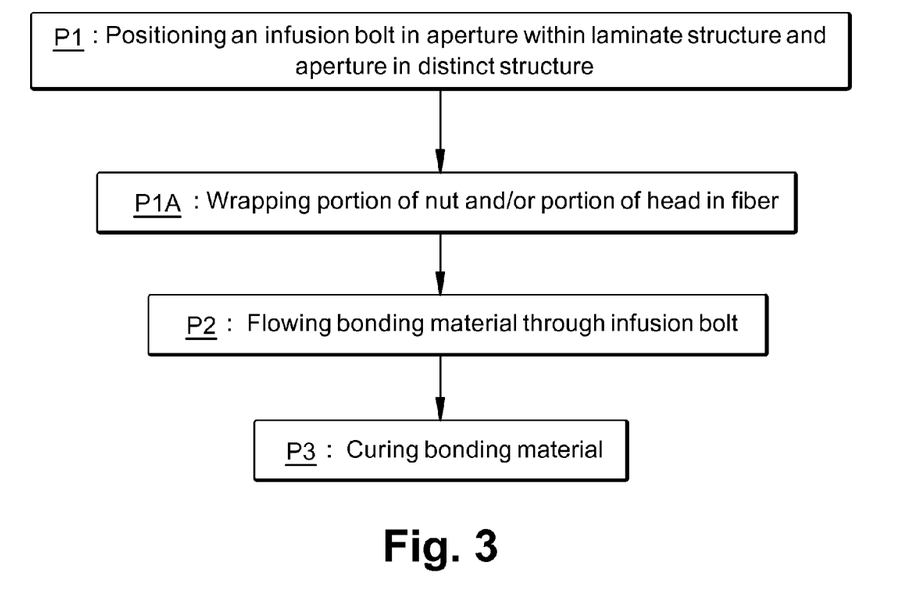
FIG. 3 shows a flow diagram illustrating processes in methods according to various embodiments.

FIG. 3 shows a schematic flow diagram illustrating processes in a method according to various embodiments.

Figure 4:
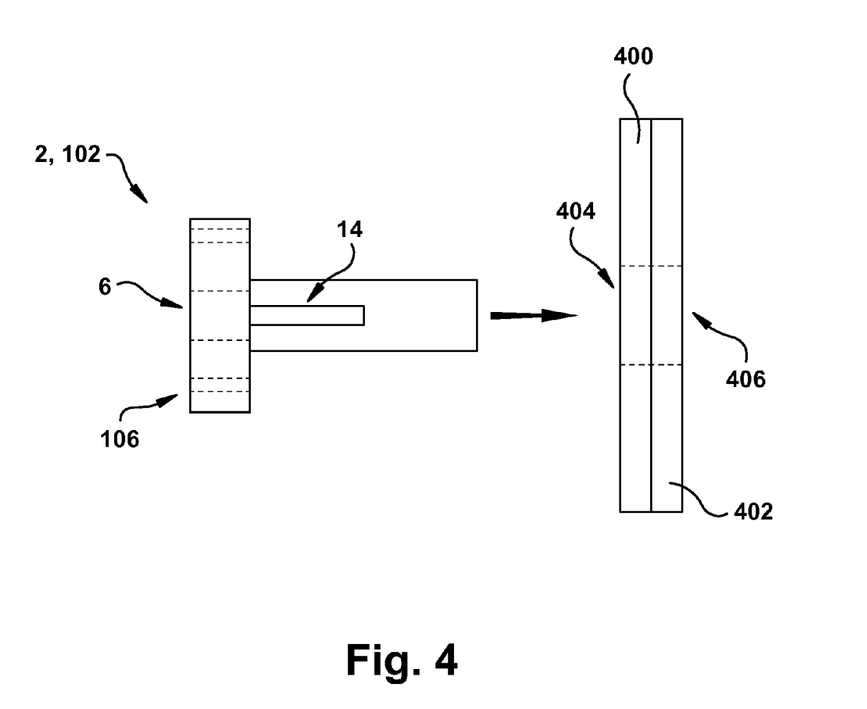
FIGS. 4-6 show schematic depictions of processes according to the flow diagram of FIG. 3.
Figure 5:
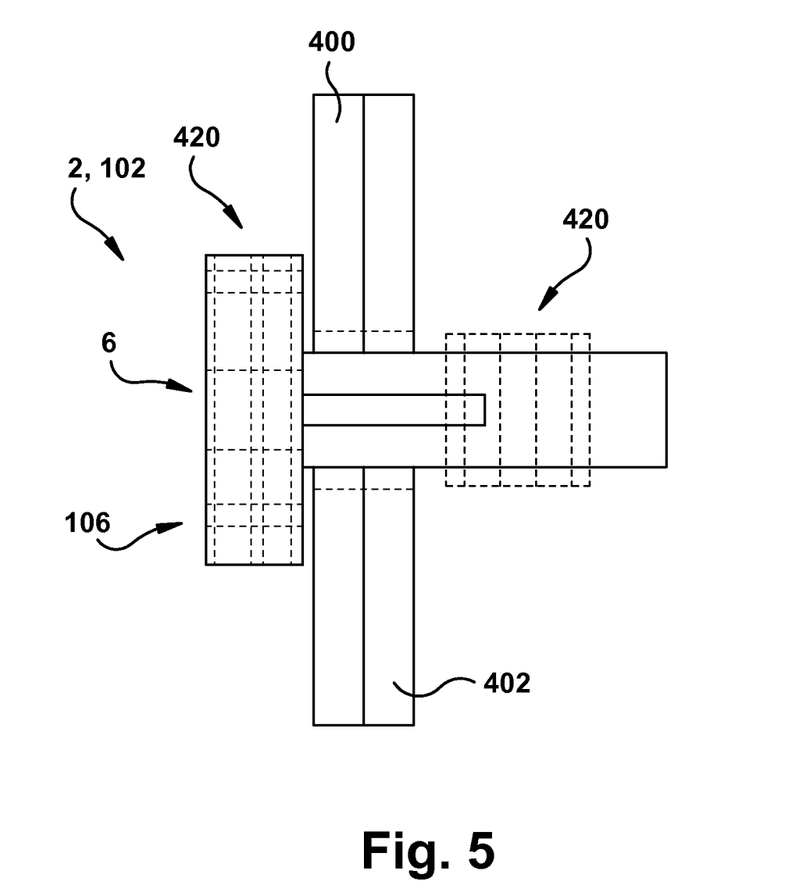
Figure 6:
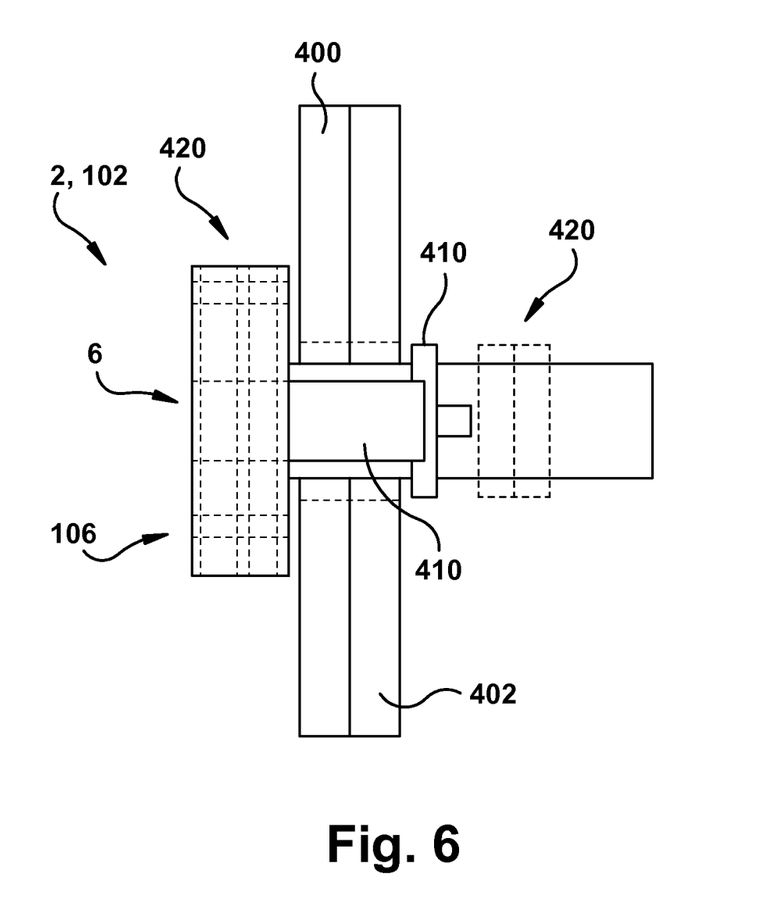

FIGS. 4-6 show schematic three-dimensional depictions of an infusion bolt (e.g., infusion bolt 2 and/or infusion bolt 102) used to join a laminate structure 400 with a distinct structure 402. Reference is made to FIG. 3, as well as FIGS. 1-2 and 4-6, in order to illustrate methods according to various embodiments herein. As shown, a method according to various embodiments can include the following processes:

Process P1: positioning an infusion bolt (e.g., infusion bolt 2 or infusion bolt 102) in an aperture 404 within a laminate structure 400 and in an aperture 406 in the distinct structure 402. According to various embodiments, the laminate structure 400 includes a composite material coated in a laminate, and the distinct structure 402 includes one of: a composite material coated in a laminate, a delaminated composite, or a constituent component.

Process P1A: in various optional embodiments, an additional process can include wrapping at least one of a portion of the head 4 or a portion of the shaft 8 (or portion of head 104 or portion of shaft 108) in a fiber 420 (e.g., glass fiber, carbon fiber and/or silicone fiber) 420, either before or after placing the infusion bolt 2, 102 in the apertures 404, 406.

Process P2 (following process P1, and in some cases, process P1A) can include: flowing a bonding material 410 (FIG. 6) through the infusion bolt 2, 102, between the axially accessible opening 6 and the axially extending apertures (e.g., 14, 114) to join the laminate structure 400 and the distinct structure 402. According to various embodiments, the bonding material 410 can include: a composite resin, e.g., an epoxy resin, vinyl-ester resin, polyester resin and/or thermal-setting resin; and/or an adhesive such as epoxy, polyurethane and/or methyl-methacrylate (MMA). In some cases, the flowing process includes vacuum pulling the bonding material 410 through the inner cavity 10 in the infusion bolt 2, 102. In other cases, the flowing process includes injecting the bonding material 410 into the inner cavity 10 in the infusion bolt 2, 102.

Process P3 (following process P2; optional post-process): curing the bonding material 410 after the flowing to bond the laminate structure 400 and the distinct structure 402.

Figure 7:
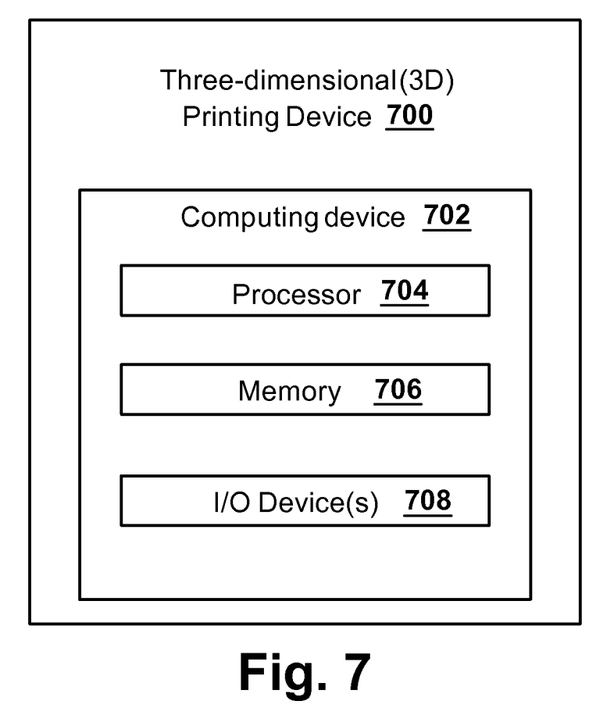
FIG. 7 shows a schematic depiction of a three-dimensional (3D) printing device for forming an infusion bolt according to various embodiments.

According to various embodiments, a method can also include forming the infusion bolt 2 and/or infusion bolt 102 by three-dimensional printing. FIG. 7 shows a three-dimensional printing device 700, including a computing device 702 programmable to perform a process of printing an infusion bolt (e.g., infusion bolt 2 and/or infusion bolt 102) according to various embodiments. The computing device 702 can include conventional computer architecture, including a processor 704, memory 706 and input/output (I/O) devices 708. The three-dimensional printing device 700 can be programmed, via the computing device 702, to form (print) at least one infusion bolt (e.g., infusion bolt 2 and/or infusion bolt 102), e.g., from a plastic and/or laser-sintered powder metal.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An infusion bolt comprising:
a head having an axially accessible opening extending therethrough, wherein the head has a diameter $D_h$;
a set of axially extending passages extending entirely through the head located radially outward of the axially accessible opening, wherein the set of axially extending passages open in a direction parallel to a shaft; and
the shaft extending from the head, the shaft having a diameter $D_n$, wherein $D_h$ is greater than $D_n$, the shaft having:
an inner cavity fluidly connected with the axially accessible opening of the head;
a radially outer surface surrounding the inner cavity; and
at least two distinct apertures along the radially outer surface, the at least two distinct apertures fluidly connected with the inner cavity and the axially accessible opening in the head, wherein the at least two distinct apertures each have a greater axial length than a circumferential length, the circumferential length measured along the radially outer surface, wherein the at least two distinct apertures do not axially extend to a distal end of the shaft opposite the head, wherein the shaft terminates at a flat surface in a direction perpendicular to the shaft at the distal end of the shaft.

2. The infusion bolt of claim 1, wherein the axially accessible opening is substantially circular.

3. The infusion bolt of claim 2, wherein the head has a radial center, and wherein the axially accessible opening is substantially concentric about the radial center.

4. The infusion bolt of claim 1, wherein the at least two distinct apertures and the axially accessible opening allow fluid to pass from a distal end of the head to the radially outer surface of the shaft.

5. The infusion bolt of claim 1, wherein the two distinct apertures oppose one another along the radially outer surface.

6. The infusion bolt of claim 1, wherein the head has a greater diameter than a diameter of the shaft, and wherein the axially accessible opening has a lesser diameter than the diameter of the shaft.

7. The infusion bolt of claim 1, wherein the head and the shaft are substantially unitary and include metal or plastic.

8. A method comprising:
three-dimensionally printing an infusion bolt, the infusion bolt having:
a head having an axially accessible opening extending therethrough, wherein the head has a diameter $D_h$;
a set of axially extending passages extending entirely through the head located radially outward of the axially accessible opening, wherein the set of axially extending passages open in a direction parallel to a shaft; and
the shaft extending from the head, the shaft having a diameter $D_n$, wherein $D_h$ is greater than $D_n$, the shaft having:
an inner cavity fluidly connected with the axially accessible opening of the head;
a radially outer surface surrounding the inner cavity; and
at least two distinct apertures along the radially outer surface, the at least two distinct fluidly connected with the inner cavity and the axially accessible opening in the head, wherein the at least two distinct apertures each have a greater axial length than a circumferential length, the circumferential length measured along the radially outer surface, wherein the at least two distinct apertures do not axially extend to a distal end of the shaft opposite the head, wherein the shaft terminates at a flat surface in a direction perpendicular to the shaft at the distal end of the shaft.

9. The method of claim 8, wherein the infusion bolt is printed from a plastic or a laser-sintered powder metal.

* * * * *